United States Patent
Avraham

(10) Patent No.: US 9,871,688 B2
(45) Date of Patent: Jan. 16, 2018

(54) FREQUENCY-SELECTIVE QUADRATURE BASEBAND COUPLING CANCELLATION

(71) Applicant: Intel IP Corporation, Santa Clara, CA (US)

(72) Inventor: Oren E. Avraham, Herzlia (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/869,023

(22) Filed: Sep. 29, 2015

(65) Prior Publication Data

US 2017/0093609 A1    Mar. 30, 2017

(51) Int. Cl.
| | |
|---|---|
| *H04L 27/36* | (2006.01) |
| *H04L 27/38* | (2006.01) |
| *H04B 1/10* | (2006.01) |
| *H04B 17/11* | (2015.01) |

(52) U.S. Cl.
CPC ....... *H04L 27/3863* (2013.01); *H04B 1/1036* (2013.01); *H04B 17/11* (2015.01); *H04L 27/364* (2013.01)

(58) Field of Classification Search
CPC .. H04L 27/364; H04L 27/3863; H04B 1/0475
USPC ........................................ 375/296, 316, 346
See application file for complete search history.

(56) References Cited

U.S. PATENT DOCUMENTS

| | | | | |
|---|---|---|---|---|
| 9,160,586 | B1* | 10/2015 | Hu | ........................ H04L 27/0014 |
| 9,276,798 | B2* | 3/2016 | Yu | ........................ H04L 27/364 |
| 2006/0198475 | A1* | 9/2006 | Wu | ........................ H03D 3/009 |
| | | | | 375/346 |
| 2014/0307768 | A1* | 10/2014 | Gotman | ............... H04B 1/0475 |
| | | | | 375/232 |

FOREIGN PATENT DOCUMENTS

WO    WO-2014043600 A1    3/2014

OTHER PUBLICATIONS

Casaleiro, J., et al., "A Quadrature RC-Oscillator With Capacitive Coupling", Integration, The VLSI Journal, vol. 52, Jun. 26, 2015, pp. 260-271, XP029329970.

Kim, M., et al., "Parametric Method of Frequency-Dependent I/Q Imbalance Compensation for Wideband Quadrature Modulator", IEEE Transactions On Microwave Theory and Techniques, vol. 61, No. 1, Jan. 1, 2013, pp. 270-280, XP011488083.

Kirei, B. S., et al., "Blind Frequency-Selective I/Q Mismatch Compensation Using Subband Processing", IEEE TRansactions on Circuits and Systems, vol. 59, No. 5, May 1, 2012, XP011444097.

(Continued)

*Primary Examiner* — David S Huang
(74) *Attorney, Agent, or Firm* — Schiff Hardin LLP

(57) ABSTRACT

Described herein are architectures, platforms and methods for implementing cancellation of asymmetric quadrature gain imbalance due to frequency selective quadrature baseband coupling in a transceiver of device. Radio frequency (RF) are converted to quadrature baseband signals, estimation is made as to coupling between in-phase (I) and quadrature-phase (Q) channels of the quadrature baseband signals. The quadrature baseband signals are converted into digital baseband signals, and digital compensation is applied on the digital baseband signal based on the estimated amount of coupling.

20 Claims, 5 Drawing Sheets

(56) References Cited

OTHER PUBLICATIONS

Y. Wang, et al., "System Simulation of Adaptive I/Q Mismatch Compensation Method Using SystemC-AMS", PH. D. Research in Microelectronics and Electronics (Prime), Jul. 18, 2010, pp. 1-4, XP031764365.
Windisch, M., et al., "Adaptive I/Q Imbalance Compensation in Low-IF Transmitter Architectures", 2004 IEEE 60th Vehicular Technology Conference, vol. 3, Sep. 26, 2004, pp. 2096-2100, XP010787009.
European Patent Office, European Search Report for EP 16185768, 3 pgs, dated Feb. 28, 2017.

* cited by examiner

FREQUENCY-SELECTIVE QUADRATURE BASEBAND COUPLING CANCELLATION

BACKGROUND

An increasing number of wireless communication standards as applied to devices and a trend towards ever smaller, slimmer and lighter portable devices may cause major design challenges for transceiver circuitries of device. Particularly, the design challenges may relate to reduction of noise, jitters, etc. during receiving or transmission operations in the transceiver circuitry.

For example, quadrature transmitters and receivers have an inherent gain and phase imbalance between their in-phase (I) path and quadrature (Q) path. The imbalance may induce poor IMRR (Image Rejection Ratio) that may degrade overall signal to noise ratio (SNR). In this example, a previous solution to cancel the gain and phase imbalance involves a highly complex approach referred to as Asymmetric Baseband (BB) Equalizer or Complex BB Linear Adaptive Equalizer.

The solution mentioned above is based on an LMS decision directed complex BB equalizer, which includes the optimization of 4 digital filters. Given a sufficient number of coefficients for all 4 filters and for certain conditions (beyond the scope of this document), such a solution should be able to compensate for all commonly known quadrature imbalance impairments fairly well. However, this solution does not compensate for frequency-selective quadrature (IQ) gain imbalance which is not symmetrical about y-axis when plotted versus baseband-frequency (i.e., negative frequencies and positive frequencies must exhibit equal gain imbalance for the compensation filter to correct them). As such, there is a need to improve cancellation of gain and phase imbalance using a simple approach during receiving or transmitting operation in the portable device.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for a low-cost cancellation of frequency-selective quadrature baseband coupling in a transceiver circuitry of a device. Particularly, the method and apparatus as described herein cancels, among others, an asymmetric quadrature gain imbalance that may be generated by the frequency-selective quadrature baseband coupling in the transceiver circuitry of the portable device. It is to be understood, that the described concepts may be implemented as well to stationary devices such as access points (APs).

In an implementation, the transceiver circuitry receives and converts a radio frequency (RF) signal into quadrature baseband signals i.e., in-phase (I) and quadrature-phase (Q) baseband signals from I and Q channels, respectively. In this implementation, a coupling detector component, which may be disposed at front-end of the transceiver circuitry, may be configured to estimate an amount of capacitive and/or inductive coupling that may be generated in between the I and Q channels.

After conversion of the I and Q baseband signals into digital baseband signals by an analog-to-digital converter (A/D converter), a digital compensator component is configured to apply digital compensation to the digital baseband signals based on the estimated amount of capacitive and/or inductive coupling in between the I and Q channels. The application of the digital compensation, for example, eliminates or substantially reduces asymmetric quadrature gain imbalance that may be generated by the coupling between the I and Q channels. In this manner, a simple low-cost cost frequency selective quadrature baseband coupling cancellation is implemented in the transceiver circuitry of the device.

In other implementations, the frequency selective quadrature baseband coupling cancellation may be implemented during transmission operation or when the transceiver circuitry utilizes differential signals for the I and Q channels. In these other implementations, similar process or principle as described during reception of the RF signals may be applied.

Figure 1:
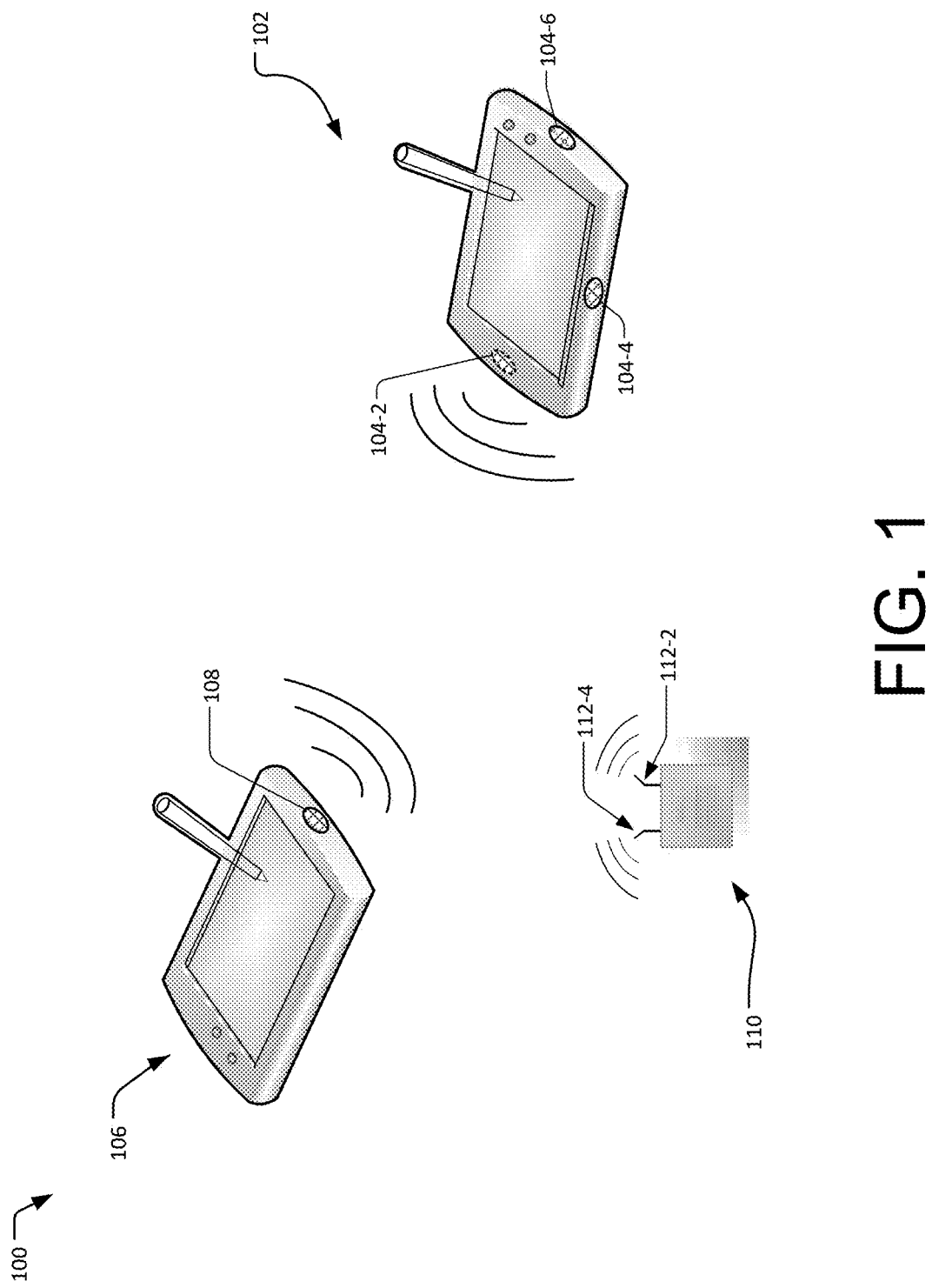
FIG. 1 is an example arrangement of portable devices as described in present implementations herein.

FIG. 1 is an example arrangement 100 of devices as described in present implementations herein. As shown, the arrangement 100 illustrates a device 102 with multiple antenna arrays 104-2, 104-4 and 104-6; and another portable device 106 with a single antenna array 108. The arrangement 100 further illustrates an AP 110 with antenna arrays 112-2 and 112-4.

The devices 102 or 106 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

As described in present implementations herein, the device 102 may receive RF signals from either the portable device 106 or the AP 110. The RF signals, for example, utilize quadrature modulations such as quadrature amplitude modulation (QAM), phase-shift keying, and the like. In this example, the device 102 may convert the RF signals into I and Q baseband signals. That is, the RF signals are converted and separated between I and Q channels for the I and Q baseband signals, respectively, prior to demodulation process.

For the I and Q channels, the portable device 102 may be configured to estimate an amount of capacitive and/or inductive coupling that may be generated in between the I and Q channels. For example, a capacitive and/or inductive coupling may be generated upon low pass filtering (not shown) at the I and Q channels during a receiving operation of the portable device 102. In another example, other circuitries, components, and the like, within the transceiver circuitry or adjacent circuitries within the device 102 may add capacitive and/or inductive coupling between the I and Q channels. In these examples, the device 102 measures the amount of total capacitive and/or inductive coupling present, and subsequently apply a digital compensating signal to eliminate or at least reduce asymmetric quadrature gain imbalance, noise, jitters, etc. that may be generated by the capacitive and/or inductive couplings.

Although the example arrangement 100 illustrates in a limited manner basic components of wireless communications between the devices 102 and 106, other components such as battery, one or more processors, SIM card, etc. were not described in order to simplify the embodiments described herein.

Figure 2:
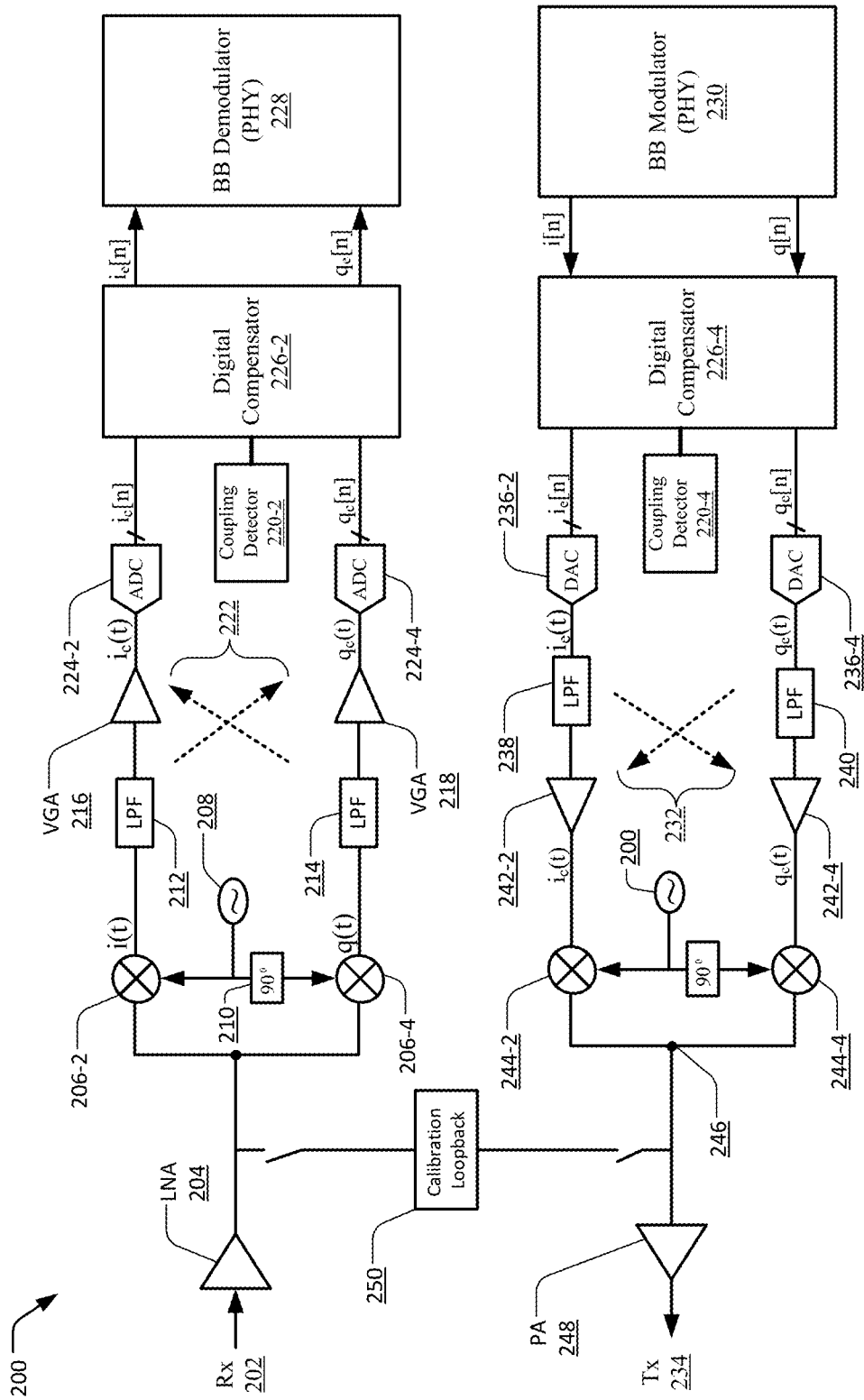
FIG. 2 is an example transceiver circuitry of a portable device that is configured to implement a low-cost frequency selective quadrature baseband coupling cancellation.

FIG. 2 illustrates an example transceiver circuitry 200 that is configured to implement the low-cost frequency selective quadrature baseband coupling cancellation as described herein. During RF signal reception or transceiver receiving operation, FIG. 2 shows an Rx signal 202 that is initially amplified through a low noise amplifier (LNA) 204 at a front-end of the transceiver 200. Thereafter, the amplified Rx signal 202 passes through mixers 206-2 and 206-4 to separate the amplified Rx signal 202 between I and Q channels. A local oscillator 208 and a 90° phase shifter 210, for example, may facilitate separation of the amplified Rx signal 202 between the I and Q channels.

For the I and Q channels, low pass filters (LPFs) 212 and 214 may be configured to generate an analog I and Q baseband signals, respectively. The analog I baseband signals and Q baseband signals are further amplified, for example, by variable gain amplifiers (VGAs) 216 and 218, respectively, to generate amplified I and Q baseband signals.

As described in present implementations herein, a coupling detector 220 may be configured to detect, estimate, and/or measure an amount of coupling 222 that may be generated between the I and Q channels of the transceiver 200. The coupling 222, for example, may include capacitive and/or inductive coupling that may be generated upon low pass filtering at the I and Q channels. In another example, the coupling 222 is generated by other components, external circuitries, etc. within the portable device 102. In these examples, the capacitive and/or inductive coupling may create baseband frequency-selective asymmetrical gain imbalance between the I and Q channels.

For different coupling sources above, the coupling detector 220 may be configured to measure the amount of total capacitive and/or inductive coupling 222 present between the I channel going to the direction of the Q channel, and vice-versa. The measurement by the coupling detector 220, for example, may be performed prior to transformation by ADC 224 of the analog I and Q baseband signals into digital baseband signals.

With the measured amount of capacitive and/or inductive coupling 222, a digital compensator 226 may be configured to apply a digital compensating signal or digital compensation to eliminate or at least reduce effects of the frequency-selective asymmetrical gain imbalance due to quadrature baseband coupling 222 in the transceiver 200. The digital compensating signal may be applied prior to the transformation by the ADC 224 into digital baseband signals, or after the transformation. For example, a configured amount of capacitance and/or inductance value may be introduced at the analog baseband signals based on the measured amount of coupling 222. Similarly, digital compensating signal may be introduced at the digital baseband signals after the transformation by the ADC 224. Thereafter, a baseband demodulator circuitry 228 may process the I and Q baseband signals from the I and Q channels, respectively, where the I and Q channels are substantially free from frequency-selective coupling after the implementation of the digital compensation as described herein.

In a similar manner, and during a transmission operation, a quadrature modulated signal from a baseband modulator 230 is processed through the coupling detector 220-4 and digital compensator 226-4 in order to eliminate or at least reduce a frequency-selective coupling 232. The coupling 232, for example, may be generated between the I and Q channels by transceiver components, external components, etc. during the transmission operation.

As described herein, and similar to the process during transceiver receiving operations, the frequency-selective coupling 232 is cancelled prior to transmission of a quadrature modulated Tx signal 232. For example, the coupling detector 220-4 is configured to estimate the amount of coupling 232. In this example, the digital compensator 226-4 is configured to apply the digital compensation based upon the estimated amount of coupling 232. In this example still, the compensation can also be applied at analog domain i.e., prior to conversion of analog modulating signals into digital modulating signals.

As shown, I and Q components of the quadrature modulated signals are processed through a digital-to-analog converter (DAC) 236, LPFs 238 and 240, VGAs 242, and mixers 244, before being combined at signal combiner 246. In this example, a power amplifier (PA) 248 amplifies the quadrature modulated RF signal—Tx 234 prior to transmission. Furthermore, a calibration loopback 250 may be implemented, for example, to adjust impedance within circuitry, and the like, of the transceiver 200. In other implementations, the calibration loopback 250 may also be used for coupling detection purposes.

During the transmission operation in the transceiver 200, the asymmetric gain imbalance due to frequency-selective coupling 232 is cancelled prior to mixing of quadrature signals in the mixers 244. As opposed to the receiving operations as described earlier, the asymmetric gain imbalance due to frequency-selective coupling 222 is cancelled prior to demodulation by the baseband demodulator 228.

Figure 3:
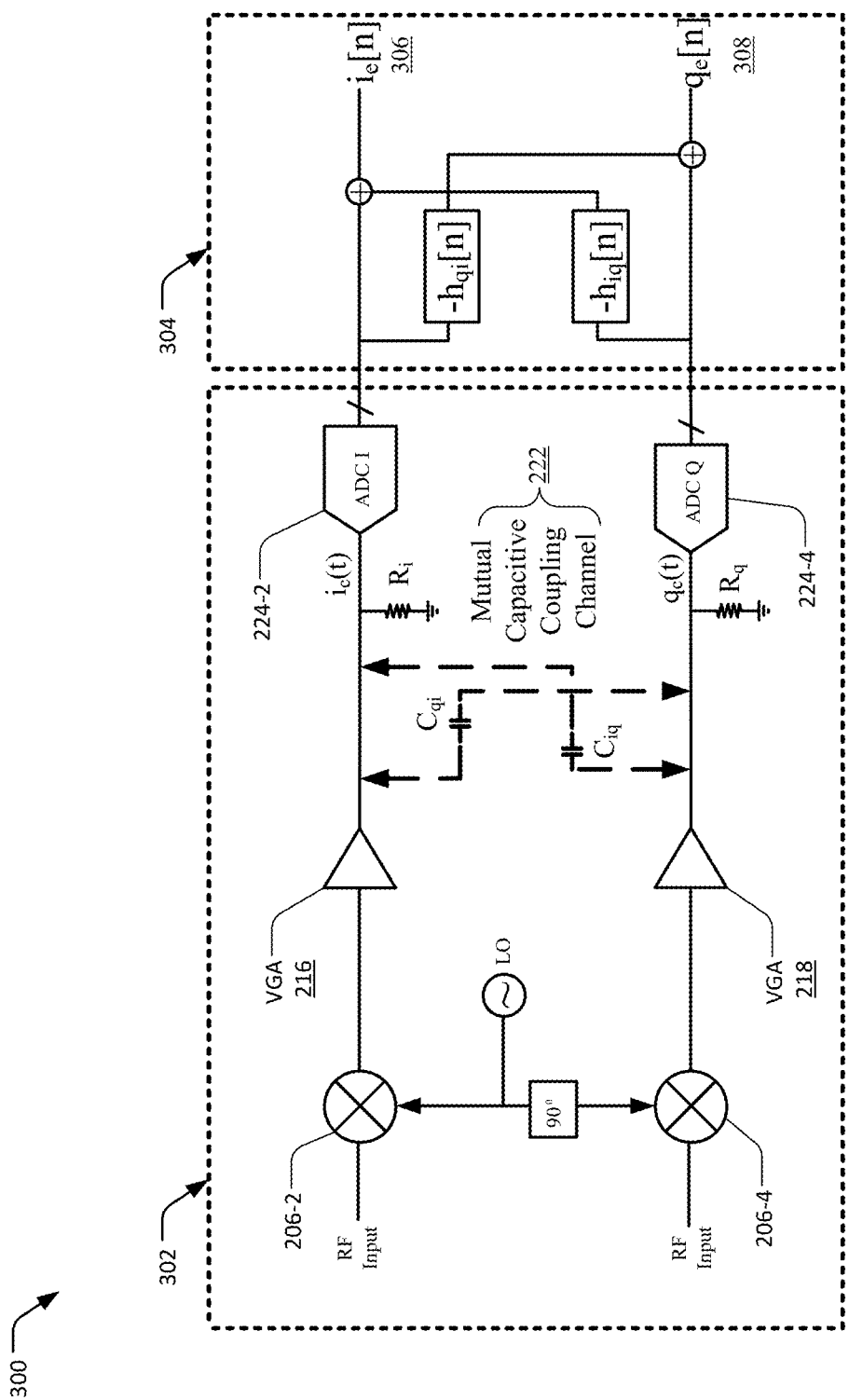
FIG. 3 is an example model of the transceiver circuitry to illustrate a mathematical derivation for presence of coupling and subsequent removal of the frequency-selective coupling after digital compensation is applied.

FIG. 3 illustrates an example model 300 of the transceiver circuitry to illustrate mathematical derivation for presence of coupling and subsequent removal of the frequency-selective coupling after digital compensation is applied. As shown, the model 300 includes a first block 302 for transforming received RF signals such as the Rx signal 202 into quadrature baseband signals. Furthermore, the model 300 shows a second block 304 that illustrates a model for correcting the capacitive and/or inductive coupling 222, which is generated at the first block 302. The second block 304 further shows an $i_e[n]$ signal 306 and a $q_e[n]$ signal 308 as filtered quadrature digital baseband signals after cancellation of the frequency-selective coupling 222.

At the second block 304, a representation of the coupling I and Q channels at the frequency domain of the digital baseband signals may be as follows:

$$H_{qi}(f) = \frac{2\pi j R_q C_{qi} f - jaf}{1 + 2\pi j R_q C_{qi} f} \frac{}{1 + jaf} \qquad \text{Eq. 1}$$

where $a = 2\pi R_q C_{qi}$ $$H_{iq}(f) = \frac{2\pi j R_1 C_{iq} f - jbf}{1 + 2\pi j R_1 C_{iq} f} \frac{}{1 + jbf} \qquad \text{Eq. 2}$$

where $b = 2\pi R_i C_{iq}$ where variable "a" is a coupling factor from the I channel to the Q channel, and variable "b" is a coupling factor from the Q channel to the direction of the I channel. The variables "a" and "b" are estimated herein, for example, in order to calibrate the transceiver circuitry 200 as represented by the model 300.

Prior to conversion into digital signals by the ADC 224, the baseband quadrature signals may be represented by the following equations:

$$i_c(t)=i(t)+h_{iq}(t)*q(t) \text{ where * denotes convolution} \quad \text{Eq. 3}$$

$$q_c(t)=q(t)+h_{qi}(t)*i(t) \text{ where * denotes convolution} \quad \text{Eq. 4}$$

where variables i(t) and q(t) are I and Q components, respectively, without the capacitive coupling 222; and variables $i_c(t)$ and $q_c(t)$ are I and Q components, respectively, when the mutual capacitive coupling 222 is present.

To this end, a quadrature gain imbalance at the frequency domain and defined herein as power gain may be represented as:

$$G(f) = \quad \text{Eq. 5}$$

$$\frac{|Q_c(f)|^2}{|I_c(f)|^2} = \frac{|Q(f)+H_{qi}(f)\cdot I(f)|^2}{|I(f)+H_{iq}(f)\cdot Q(f)|^2} = \frac{(Q(f)+H_{qi}(f)\cdot I(f))\cdot(Q(f)+H_{qi}(f)\cdot I(f))^*}{(I(f)+H_{iq}(f)\cdot Q(f))\cdot(I(f)+H_{iq}(f)\cdot Q(f))^*} =$$

$$\frac{(Q(f)+H_{qi}(f)\cdot I(f))\cdot(Q^*(f)+H_{qi}^*(f)\cdot I^*(f))}{(I(f)+H_{iq}(f)\cdot Q(f))\cdot(I^*(f)+H_{iq}^*(f)\cdot Q^*(f))} = \frac{|Q(f)|^2+|H_{qi}(f)|^2\cdot|I(f)|^2+2\cdot\text{Real}\{H_{qi}(f)\cdot I(f)\cdot Q^*(f)\}}{|I(f)|^2+|H_{iq}(f)|^2\cdot|Q(f)|^2+2\cdot\text{Real}\{H_{iq}(f)\cdot Q(f)\cdot I^*(f)\}}$$

Using a single-tone input, which is representative of a wideband signal by superposition, and substituting Eq. 1 and Eq. 2 into Eq. 5, we get:

$$G(f = +f_{BB}) = \quad \text{Eq. 6}$$

$$\frac{\frac{1}{4}(\delta(f+f_{BB})+\delta(f-f_{BB}))\cdot\left(1+\frac{a^2f^2}{1+a^2f^2}\right)+2\cdot\frac{1}{4}\cdot\frac{1}{1+a^2f^2}\text{Real}\left\{\begin{array}{l}(jaf+a^2f^2)\cdot(\delta(f+f_{BB})+\delta(f-f_{BB}))\cdot\\ [-j\cdot(\delta(f+f_{BB})-\delta(f-f_{BB}))]\end{array}\right\}}{\frac{1}{4}(\delta(f+f_{BB})+\delta(f-f_{BB}))\cdot\left(1+\frac{b^2f^2}{1+b^2f^2}\right)+2\cdot\frac{1}{4}\cdot\frac{1}{1+b^2f^2}\text{Real}\left\{\begin{array}{l}(jbf+b^2f^2)\cdot(\delta(f+f_{BB})+\delta(f-f_{BB}))\cdot\\ [j\cdot(\delta(f+f_{BB})-\delta(f-f_{BB}))]\end{array}\right\}} =$$

$$\frac{(\delta(f+f_{BB})+\delta(f-f_{BB}))\cdot(1+2a^2f^2)+2af\cdot(\delta(f+f_{BB})-\delta(f-f_{BB}))}{(\delta(f+f_{BB})+\delta(f-f_{BB}))\cdot(1+2b^2f^2)-2bf\cdot(\delta(f+f_{BB})-\delta(f-f_{BB}))} =$$

$$\begin{cases} \frac{(1+2a^2f_{BB}^2)-2af_{BB}}{(1+2b^2f_{BB}^2)+2bf_{BB}}, f = +f_{BB} \\ \frac{(1+2af_{BB}^2)-2af_{BB}}{(1+2bf_{BB}^2)+2bf_{BB}}, f = -f_{BB} \end{cases}$$

The gain imbalance due to the coupling 222 is then represented as:

$$\xrightarrow{Eq.\ 6} G(f = +f_{BB}) = \frac{1+2a^2f_{BB}^2-2af_{BB}}{1+2b^2f_{BB}^2+2bf_{BB}} \quad \text{Eq. 7}$$

$$\xrightarrow{Eq.\ 6} G(f = -f_{BB}) = \frac{1+2a^2f_{BB}^2+2af_{BB}}{1+2b^2f_{BB}^2-2bf_{BB}} \quad \text{Eq. 8}$$

However, for a commutative coupling channel where a=b:

$$G(f = +f_{BB}) = \frac{1+2a^2f_{BB}^2-2af_{BB}}{1+2a^2f_{BB}^2+2af_{BB}} \quad \text{Eq. 9}$$

$$G(f = -f_{BB}) = \frac{1+2a^2f_{BB}^2+2af_{BB}}{1+2af_{BB}^2-2af_{BB}} \quad \text{Eq. 10}$$

$$G(f = +f_{BB}) = \frac{1}{G(f = -f_{BB})} \quad \text{Eq. 11}$$

$$G_{dB}(f = +f_{BB}) = -G_{dB}(f = -+f_{BB}) \quad \text{Eq. 12}$$

For non-commutative coupling channel where under normal conditions $a_{fBB} \ll 1$, and $b_{fBB}$ is also substantially lesser than 1, an approximation:

$$\frac{1}{1+x} \cong 1-x$$

where $|x| \ll 1$ may be utilized to simplify Eqs. 7 and 8 to come up with Eqs. 13-16 below.

$$G(f = +f_{BB}) = \frac{1+2a^2f_{BB}^2-2af_{BB}}{1+2b^2f_{BB}^2+2bf_{BB}} \cong \frac{1-2af_{BB}}{1+2af_{BB}} \cong \quad \text{Eq. 13}$$

$$(1-2af_{BB})\cdot(1-2bf_{BB}) \cong 1-2f_{BB}\cdot(a+b) \cong \frac{1}{1+2f_{BB}\cdot(a+b)}$$

$$G(f = -f_{BB}) = \frac{1+2a^2f_{BB}^2+2af_{BB}}{1+2b^2f_{BB}^2-2bf_{BB}} \cong \frac{1+2af_{BB}}{1-2af_{BB}} \cong \quad \text{Eq. 14}$$

$$(1+2af_{BB})\cdot(1+2bf_{BB}) \cong 1+2f_{BB}\cdot(a+b)$$

$$G(f = +f_{BB}) \cong \frac{1}{G(f = -f_{BB})} \quad \text{Eq. 15}$$

$$G_{dB}(f = +f_{BB}) = -G_{dB}(f = -+f_{BB}) \quad \text{Eq. 16}$$

Eqs. 1-16 above show that presence of the capacitive and/or inductive coupling 222 may cause asymmetric gain imbalance at the transceiver circuitry of the first block 302.

With continuing reference to FIG. 3, and particularly, at the second block 304, the coupling detector 220 that is configured to estimate amount of coupling 222 may utilize the following linear approximation:

$$g \triangleq \sqrt{\frac{G(f = +f_{BB})}{G(f = -f_{BB})}} = 1-2f_{BB}\cdot(a+b) \quad \text{Eq. 17}$$

$$a+b = \frac{1-g}{2f_{BB}} \triangleq \sigma \quad \text{Eq. 18}$$

In an implementation, to estimate the variables "a" and "b," the single tone is injected at a substantially high frequency where the quadratic element is not negligible and the quadratic equation is solved by substituting the variable "b" with "σ−a" to estimate the variable "a." In this implementation, the coupling factor may be directly measured by disabling one branch of the I channel or the Q channel and afterward measuring ratio between the two ADC output signals. Furthermore, the digital compensation is applied using an initial assumption of "a=b=σ/2" and afterwards, a short search algorithm is started using the resulting I and Q gain imbalance to select the next assumption.

Note that for inductive coupling or capacitive coupling across differential lines, a negative capacitive capacitance value may be derived.

Continuing the analog equations above, and after application of the digital compensation based from estimated amount of coupling 222, we gather:

$$i_e(t)=i_c(t)-h_{iq}(t)*q_c(t)=i(t)*(1-h_{iq}(t)*h_{qi}(t)) \quad \text{Eq. 19}$$

$$q_e(t)=q_c(t)-h_{qi}(t)*i_c(t)=q(t)*(1-h_{iq}(t)*h_{qi}(t)) \quad \text{Eq. 20}$$

After subtracting variable "$h_{iq}$"/"$h_{qi}$" in Eq. 19 and Eq. 20 above, the coupling part will cancel and a pure I digital baseband signal with substantially small residue (which is neglected for convenience) may result. The quadrature gain imbalance "$G_e(f)$" after the digital coupling compensation may now be represented as:

$$G_e(f) = \frac{|Q_e(f)|^2}{|I_e(f)|^2} = \frac{|Q(f)\cdot(1-H_{qi}(f)\cdot H_{qi}(f))|^2}{|I(f)\cdot(1-H_{iq}(f)\cdot H_{qi}(f))|^2} = \frac{|Q(f)|^2}{|I(f)|^2}, \quad \text{Eq. 21}$$

where $(1-H_{iq}(f)\cdot H_{qi}(f)) \neq 0$

As described in present implementation herein, Eq. 21 shows cancellation of the asymmetric quadrature gain imbalance due to the frequency-selective coupling 222. The expression "$(1-H_{iq}(f)\cdot H_{qi}(f))$" in Eq. 21 may have a negligible effect on signal flatness and need not be digitally compensated by the digital compensator 226 as described herein.

In other implementations such as when the I and Q quadrature signals are represented by differential input signals, similar procedure as described above is implemented to cancel the asymmetric quadrature gain imbalance due to the frequency-selective coupling 222.

Figure 4:
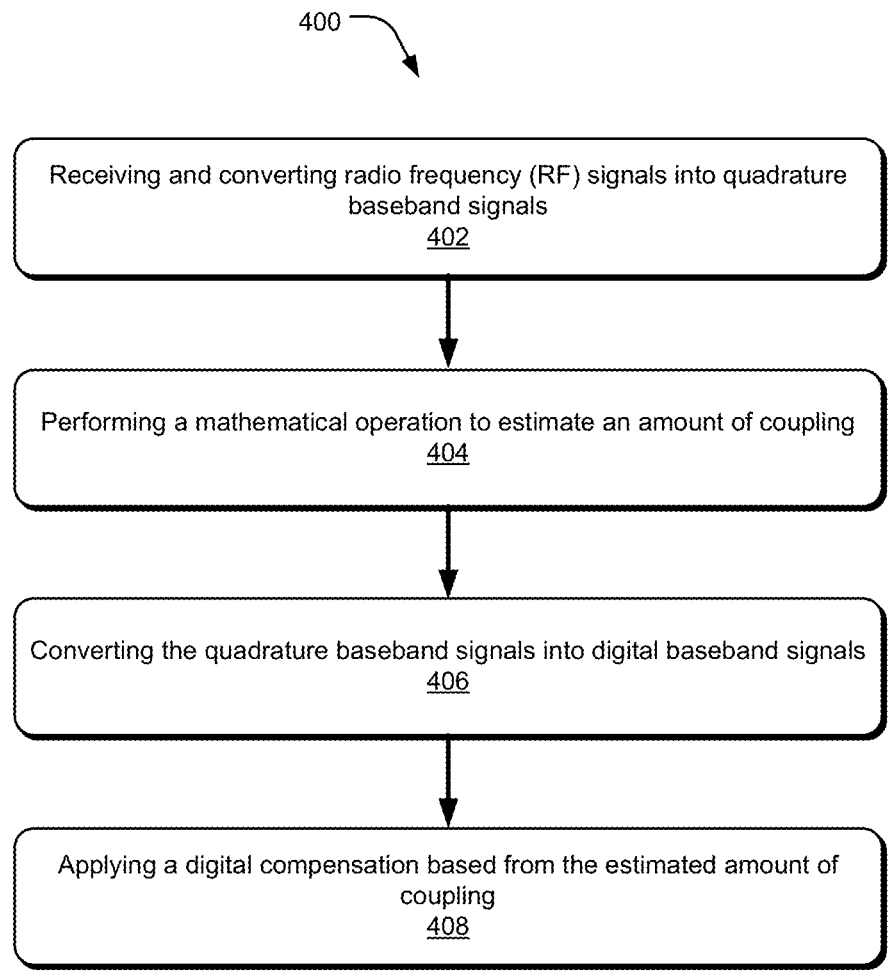
FIG. 4 is an example process chart illustrating an example method for a simple low-cost cancellation of asymmetric quadrature gain imbalance due to frequency selective quadrature baseband coupling in a transceiver circuitry of a portable device

FIG. 4 shows an example process chart 400 illustrating an example method for a simple low-cost cancellation of asymmetric quadrature gain imbalance due to frequency selective quadrature baseband coupling in a transceiver circuitry of a portable device. For example, the asymmetrical quadrature gain imbalance in the transceiver circuitry 200 of the portable device 102 is reduced or eliminated as described herein. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, receiving and converting RF signals into quadrature baseband signals is performed. For example, during receiving operation by the transceiver 200, the Rx signal 202 is received and converted into I and Q baseband signals through the I and Q channels, respectively.

At block 404, performing a mathematical operation to estimate an amount of coupling between I and Q signals is performed. For example, the coupling detector 220 is configured estimate the amount of frequency-selective quadrature baseband coupling 222 that may generate asymmetric gain imbalance in the transceiver 200.

At block 406, converting baseband signals into digital signals is performed. For example, the ADC 224 may be configured to perform analog to digital conversion of the analog I and Q baseband signals.

At block 408, applying a digital compensation based from the estimated amount of coupling is performed. For example, the digital compensator 226 is configured to apply a digital compensating signal to cancel the effects of the estimated frequency-selective quadrature baseband coupling 222. In other implementations, the compensation may be applied prior to conversion of the baseband signals into digital signals. That is prior to conversion of the signal by the ADC 224 or the DAC 236.

Figure 5:
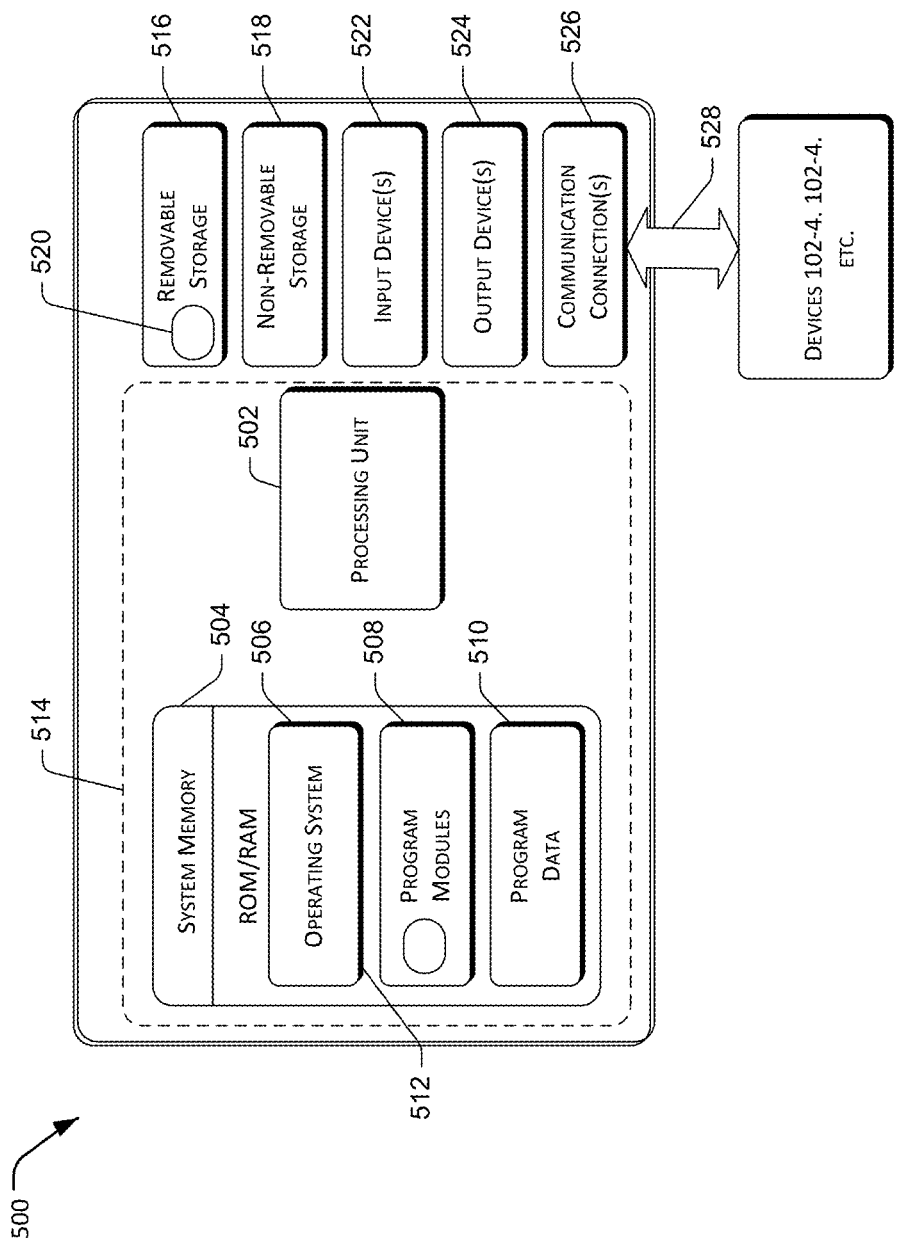
FIG. 5 is an example system that may be utilized to implement a low-cost frequency selective quadrature baseband coupling cancellation.

FIG. 5 is an example system that may be utilized to implement various described embodiments. However, it will be readily appreciated that the techniques disclosed herein may be implemented in other computing devices, systems, and environments. The computing device 500 shown in FIG. 5 is one example of a computing device and is not intended to suggest any limitation as to the scope of use or functionality of the computer and network architectures.

In at least one implementation, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508 that implement the long delay echo algorithm, and may include program data 510. A basic implementation of the computing device 500 is demarcated by a dashed line 514.

The program module 508 may include a module 512 configured to implement the one-tap connection and synchronization scheme as described above. For example, the module 512 may carry out one or more of the method 500, and variations thereof, e.g., the computing device 500 acting as described above with respect to the device 102.

Computing device 500 may have additional features or functionality. For example, computing device 500 may also include additional data storage devices such as removable storage 516 and non-removable storage 518. In certain implementations, the removable storage 516 and non-removable storage 518 are an example of computer accessible media for storing instructions that are executable by the processing unit 502 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 500 and wireless mobile device 102. Any of such computer accessible media may be part of the computing device 500.

In one implementation, the removable storage 516, which is a computer accessible medium, has a set of instructions 530 stored thereon. When executed by the processing unit 502, the set of instructions 530 cause the processing unit 502 to execute operations, tasks, functions and/or methods as described above, including method 500 and any variations thereof Computing device 500 may also include one or more input devices 520 such as keyboard, mouse, pen, voice input device, touch input device, etc. Computing device 500 may additionally include one or more output devices 522 such as a display, speakers, printer, etc.

Computing device 500 may also include one or more communication connections 524 that allow the computing device 500 to communicate wirelessly with one or more other wireless devices, over wireless connection 528 based on near field communication (NFC), Wi-Fi, Bluetooth, radio frequency (RF), infrared, or a combination thereof It is appreciated that the illustrated computing device 500 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques", for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

The following examples pertain to further embodiments:

Example 1 is a method of frequency-selective quadrature baseband coupling cancellation, the method comprising: receiving and converting radio frequency (RF) signals into quadrature baseband signals; performing an estimation as to an amount of coupling between in-phase (I) and quadrature-phase (Q) channels of the quadrature baseband signals; converting the quadrature baseband signals into digital baseband signals; and applying a digital compensation on the digital baseband signal based on the estimated amount of coupling.

In example 2, the method as recited in example 1 further comprises using a mathematical operation to estimate the amount of coupling that is based on an assumption that a coupling factor between the I channel and the Q channel, and vice-versa, are equal.

In example 3, the method as recited in example 2 further comprises directly measuring a coupling factor by disabling one of the I channel or the Q channel and measuring a ratio between two output signals of an analog-to-digital (ADC) converter, wherein the direct measurement further comprises an injection of a single tone that is a representative of a wideband signal.

In example 4, the method as recited in example 1, wherein a coupling comprises a capacitive coupling, an inductive coupling, or both capacitive and inductive couplings.

In example 5, the method as recited in example 4, wherein the capacitive coupling or the inductive coupling across a differential line comprises a negative capacitance value.

In example 6, the method as recited in example 1, wherein the application of the digital compensation further comprises: introducing a capacitance or an inductance value to cancel the amount of coupling prior to the conversion of the quadrature baseband signals into digital baseband signals.

In example 7, the method as recited in example 1, wherein the digital compensation is applied in a frequency domain of the digital baseband signals.

In example 8, the method as recited in example 1, wherein the amount of coupling generates an asymmetric quadrature gain imbalance, which further comprises a residual element, wherein the residual element of the asymmetric quadrature gain imbalance has a negligible effect on a signal flatness and the digital compensation is not applied to the residual element.

In example 9, the method as recited in any of examples 1 to 8, wherein the estimation of the amount of coupling and the application of the digital compensation is further applied during processing and transmission of the RF signals.

Example 10 is a device comprising: an antenna array configured to receive radio frequency (RF) signals; at least one mixer configured to transform the received RF signals into quadrature RF signals; at least one low-pass filter (LPF) configured to transform the quadrature RF signals into in-phase (I) and quadrature-phase (Q) baseband signals; a coupling detector configured to estimate an amount of coupling between I and Q channels that passes the I and Q baseband signals, respectively; an analog-to-digital converter (ADC) configured to convert the I and Q baseband signals into digital baseband signals; and a digital compensator configured to apply a digital compensation on the digital baseband signal based on the estimated amount of coupling.

In example 11, the device as recited in example 10, wherein the coupling detector is to estimate the amount of coupling based on a coupling factor between the I channel and the Q channel, and vice-versa.

In example 12, the device as recited in example 11 further comprises directly measuring the coupling factor by disabling one of the I channel or the Q channel and afterwards measuring a ratio between two output signals of the ADC converter.

In example 13, the device as recited in example 10, wherein a coupling comprises a capacitive coupling, an inductive coupling, or both capacitive and inductive couplings.

In example 14, the device as recited in any of examples 10 to 13, wherein the digital compensator is further configured to introduce a capacitance or an inductance value to cancel the amount of coupling prior to the conversion of the I and Q baseband signals into digital baseband signals.

In example 15, the device as recited in example 14, wherein the application of the digital compensation is to eliminate asymmetric quadrature gain imbalance due to the coupling between the I and Q channels.

Example 16 is a transceiver circuitry comprising: a first block, which is configured to receive and convert radio frequency (RF) signals into quadrature baseband signals; a second block that is configured to: perform a mathematical operation to estimate an amount of coupling between in-phase (I) and quadrature-phase (Q) channels of the quadrature baseband signals; and apply a compensation in response to the estimated amount of coupling, wherein the applied compensation cancels a generated asymmetric quadrature gain imbalance.

In example 17 the transceiver circuitry as recited in example 16, wherein the compensation is applied prior to or after conversion of the quadrature baseband signals into digital baseband signals.

In example 18 the transceiver circuitry as recited in example 16, wherein the second block estimates the amount of coupling based from a coupling factor between the I channel and the Q channel, and vice-versa.

In example 19 the transceiver circuitry as recited in example 16, wherein the second block is configured to apply the digital compensation at frequency domain of the quadrature baseband signals.

In example 20 the transceiver circuitry as recited in any of examples 16 to 19, wherein the coupling comprises a capacitive coupling, an inductive coupling, or both capacitive and inductive couplings.

What is claimed is:

1. A method of frequency-selective quadrature baseband coupling cancellation, the method comprising:
   receiving and converting radio frequency (RF) signals into quadrature baseband signals;
   measuring a coupling factor by injecting a single tone and disabling at least one of an in-phase (I) channel or a quadrature-phase (Q) channel of the quadrature baseband signals, wherein a capacitive or an inductive coupling across the I and Q channels comprises a negative capacitance value;
   converting the quadrature baseband signals into digital I and Q baseband signals;
   measuring a ratio between the digital I and Q baseband signals; and
   applying a digital compensation on the digital I and Q baseband signals based on the measured amount of coupling factor.

2. The method as recited in claim 1 further comprises estimating the amount of coupling factor that is based on an assumption that the coupling factor between the I channel and the Q channel, and vice-versa, are equal.

3. The method as recited in claim 1, wherein the measuring of the coupling factor comprises a direct measurement of the coupling factor.

4. The method as recited in claim 1, wherein a coupling comprises the capacitive coupling, the inductive coupling, or both the capacitive and inductive couplings.

5. The method as recited in claim 1, wherein the single tone is representative of a wideband signal.

6. The method as recited in claim 1, wherein the application of the digital compensation further comprises: introducing a capacitance or an inductance value to cancel an amount of the coupling factor prior to the conversion of the quadrature baseband signals into digital baseband signals.

7. The method as recited in claim 1, wherein the digital compensation is applied in a frequency domain of the digital I and Q baseband signals.

8. The method as recited in claim 1, wherein the amount of coupling factor generates an asymmetric quadrature gain imbalance, which further comprises a residual element, wherein the residual element of the asymmetric quadrature gain imbalance has a negligible effect on a signal flatness and the digital compensation is not applied to the residual element.

9. The method as recited in claim 1, wherein the measurement of the coupling factor and the application of the digital compensation is further applied during processing and transmission of the RF signals.

10. A device comprising:
    an antenna array configured to receive radio frequency (RF) signals;
    at least one mixer configured to transform the received RF signals into quadrature RF signals;
    at least one low-pass filter (LPF) configured to transform the quadrature RF signals into in-phase (I) and quadrature-phase (Q) baseband signals;

a coupling detector configured to estimate an amount of coupling by injecting a single tone and disabling an I channel or Q channel that passes the I and Q baseband signals, respectively, wherein coupling detector measures a ratio of the I and Q baseband signals after conversion into digital baseband signals, wherein a capacitive or an inductive coupling across the I and Q channels comprises a negative capacitance value;

an analog-to-digital converter (ADC) configured to convert the I and Q baseband signals into the digital baseband signals; and a digital compensator configured to apply a digital compensation on the digital baseband signal based on the estimated amount of coupling.

11. The device as recited in claim 10, wherein the coupling detector is to estimate the amount of coupling based on a coupling factor between the I channel and the Q channel, and vice-versa.

12. The device as recited in claim 10, wherein the estimating the amount of coupling comprises a direct measurement of a coupling factor.

13. The device as recited in claim 10, wherein the coupling comprises the capacitive coupling, the inductive coupling, or both the capacitive and inductive couplings.

14. The device as recited in claim 10, wherein the digital compensator is further configured to introduce a capacitance or an inductance value to cancel the amount of coupling prior to the conversion of the I and Q baseband signals into digital baseband signals.

15. The device as recited in claim 14, wherein the application of the digital compensation is to eliminate asymmetric quadrature gain imbalance due to the coupling between the I and Q channels.

16. A transceiver circuitry comprising:

a first block, which is configured to receive and convert radio frequency (RF) signals into quadrature baseband signals;

a second block that is configured to:

estimate an amount of coupling between in-phase (I) and quadrature-phase (Q) channels of the quadrature baseband signals by injecting a single tone, disabling at least one of the I channel or the Q channel, and measuring a ratio at an output of an analog to digital converter (ADC); and apply a compensation in response to the estimated amount of coupling, wherein the applied compensation cancels a generated asymmetric quadrature gain imbalance.

17. The transceiver circuitry as recited in claim 16, wherein the compensation is applied prior to or after conversion of the quadrature baseband signals into digital baseband signals.

18. The transceiver circuitry as recited in claim 16, wherein the second block estimates the amount of coupling based from a coupling factor between the I channel and the Q channel, and vice-versa.

19. The transceiver circuitry as recited in claim 16, wherein the coupling comprises a capacitive coupling, an inductive coupling, or both capacitive and inductive couplings.

20. The transceiver circuitry as recited in claim 16, wherein the second block is configured to apply the digital compensation at frequency domain of the quadrature baseband signals.

* * * * *